United States Patent [19]

Chan

[11] Patent Number: 5,614,275

[45] Date of Patent: Mar. 25, 1997

[54] HIGH-RELIEF, RESILIENTLY FLEXIBLE, COMPOSITE MOLDED PLASTIC PRODUCT

[76] Inventor: Raymond C. L. Chan, #14 C. Wing Po Mansion, 33rd Fort Street, North Pt., Hong Kong, Hong Kong

[21] Appl. No.: 508,606

[22] Filed: Jul. 28, 1995

Related U.S. Application Data

[63] Continuation of Ser. No. 201,617, Feb. 25, 1994, abandoned.

[51] Int. Cl.$^6$ ............................ A47G 19/22; A47G 21/00
[52] U.S. Cl. .................... 428/35.7; 428/36.9; 428/36.92; 264/167; 264/503; 264/513; 30/326; 220/574; D7/516
[58] Field of Search ................... 428/36.9, 36.92, 428/519, 520, 35.7; 264/167, 503, 513; 30/323, 326, 328, 343; 220/574; D7/653, 642, 509, 516, 533, 536, 396.2, 656

[56] References Cited

U.S. PATENT DOCUMENTS

| | | | |
|---|---|---|---|
| D. 308,154 | 5/1990 | Tow | D7/516 |
| D. 351,530 | 10/1994 | Petrasek | D7/516 |
| D. 356,011 | 3/1995 | Haggerty | D7/516 |
| 2,061,482 | 11/1936 | Prost | 30/343 |
| 2,895,636 | 7/1959 | Martin | D7/509 |
| 3,191,460 | 6/1965 | Christian et al. | 30/343 |
| 4,290,248 | 9/1981 | Kemerer et al. | 264/167 |
| 4,719,063 | 1/1988 | White | 30/323 |
| 4,956,917 | 9/1990 | Chung | 30/326 |
| 5,029,720 | 7/1991 | Bridges | D7/536 |
| 5,441,164 | 8/1995 | Beck et al. | 220/574 |

Primary Examiner—Ellis Robinson
Assistant Examiner—Rena L. Dye
Attorney, Agent, or Firm—Flehr, Hohbach, Test, Albritton & Herbert

[57] ABSTRACT

A high-relief, resiliently flexible composite molded plastic product (21). The product (21) includes a relatively rigid injection molded core member (22) having a pair of oppositely facing core shoulders (26,27), and a plastic sleeve member (23) with sleeve shoulders (36,37) interengaged with the core shoulders (26,27). The sleeve member (23) is rotationally cast or molded from a plastisol dispersion having emulsion grade polyvinylchloride and suspension grade polyvinylchloride in a ratio of at least 3:1, and preferably 5:1, to produce substantial flexibility and to enable high-relief design features (46) to be molded into the sleeve member (23).

18 Claims, 4 Drawing Sheets

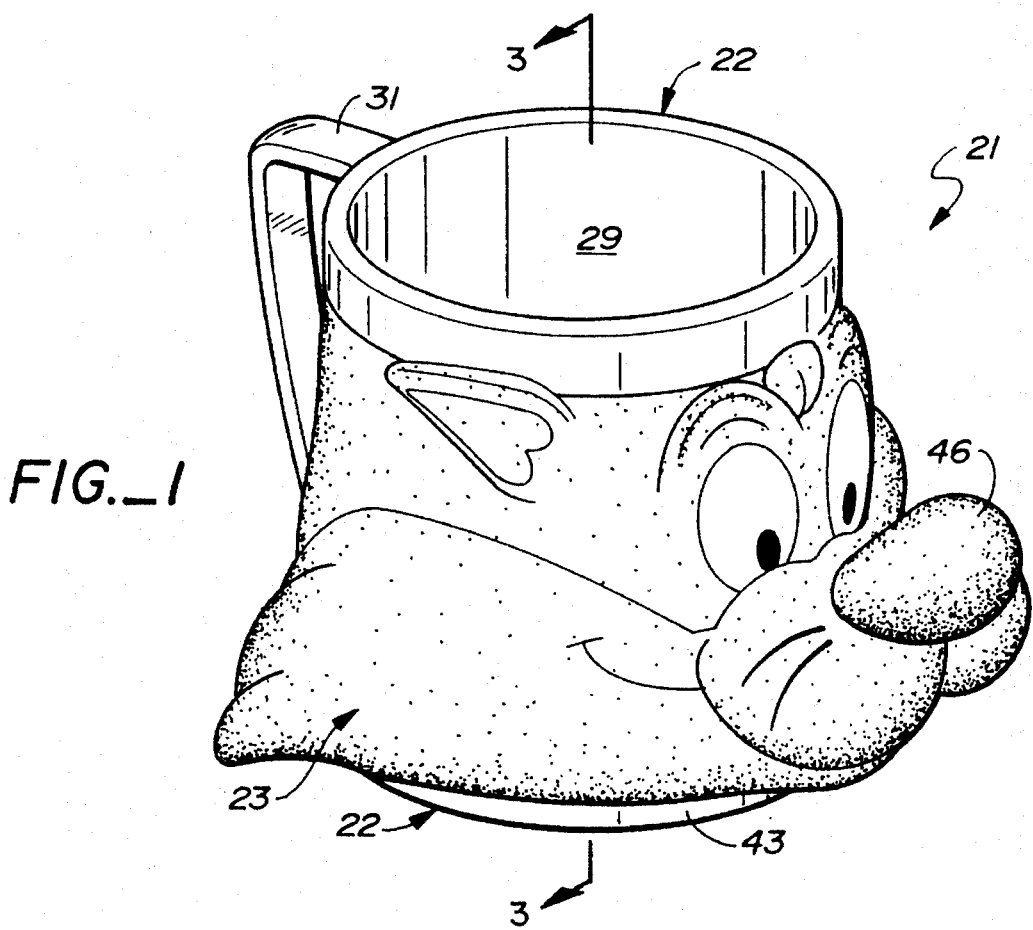
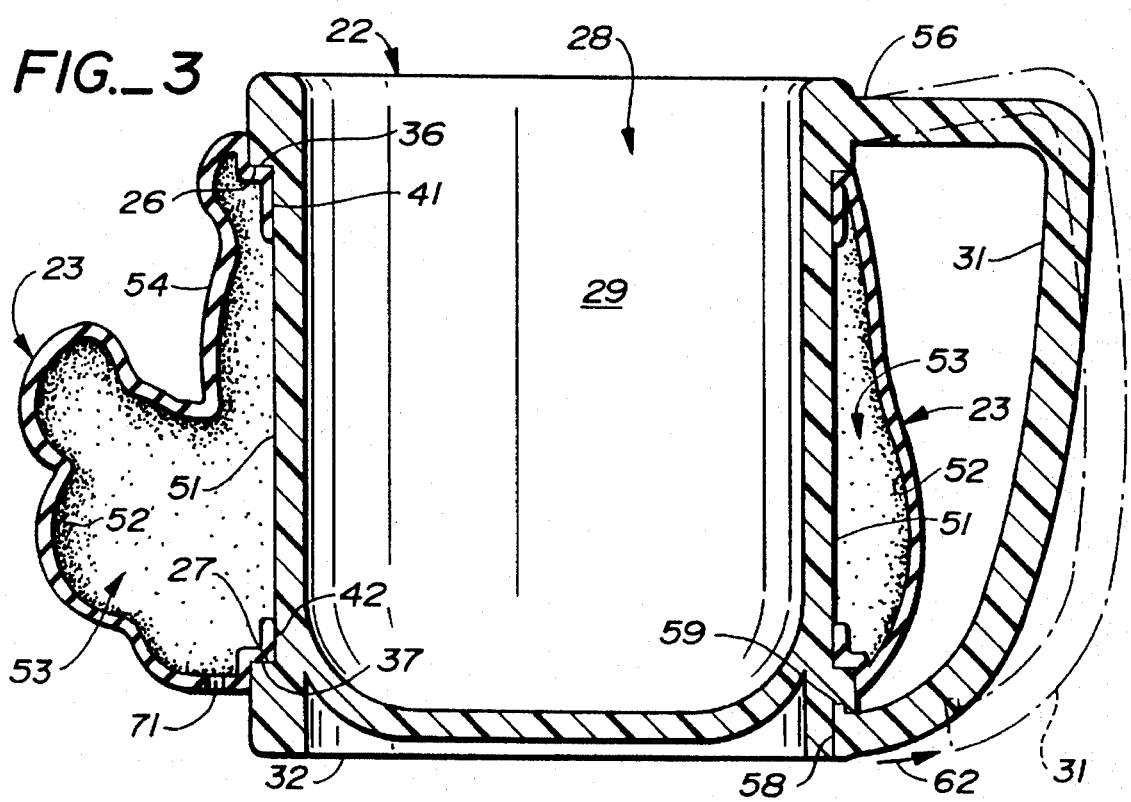

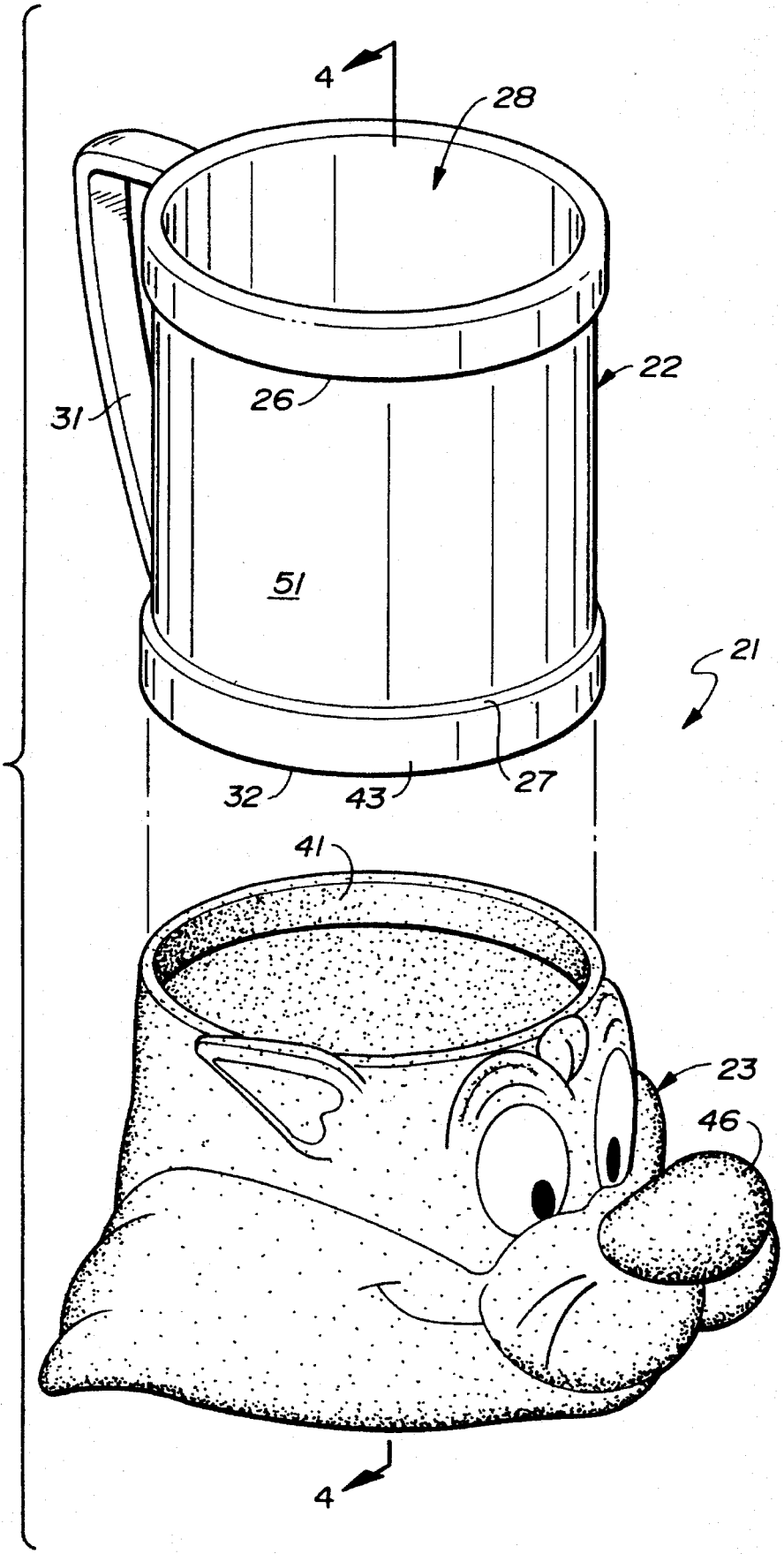
FIG._2

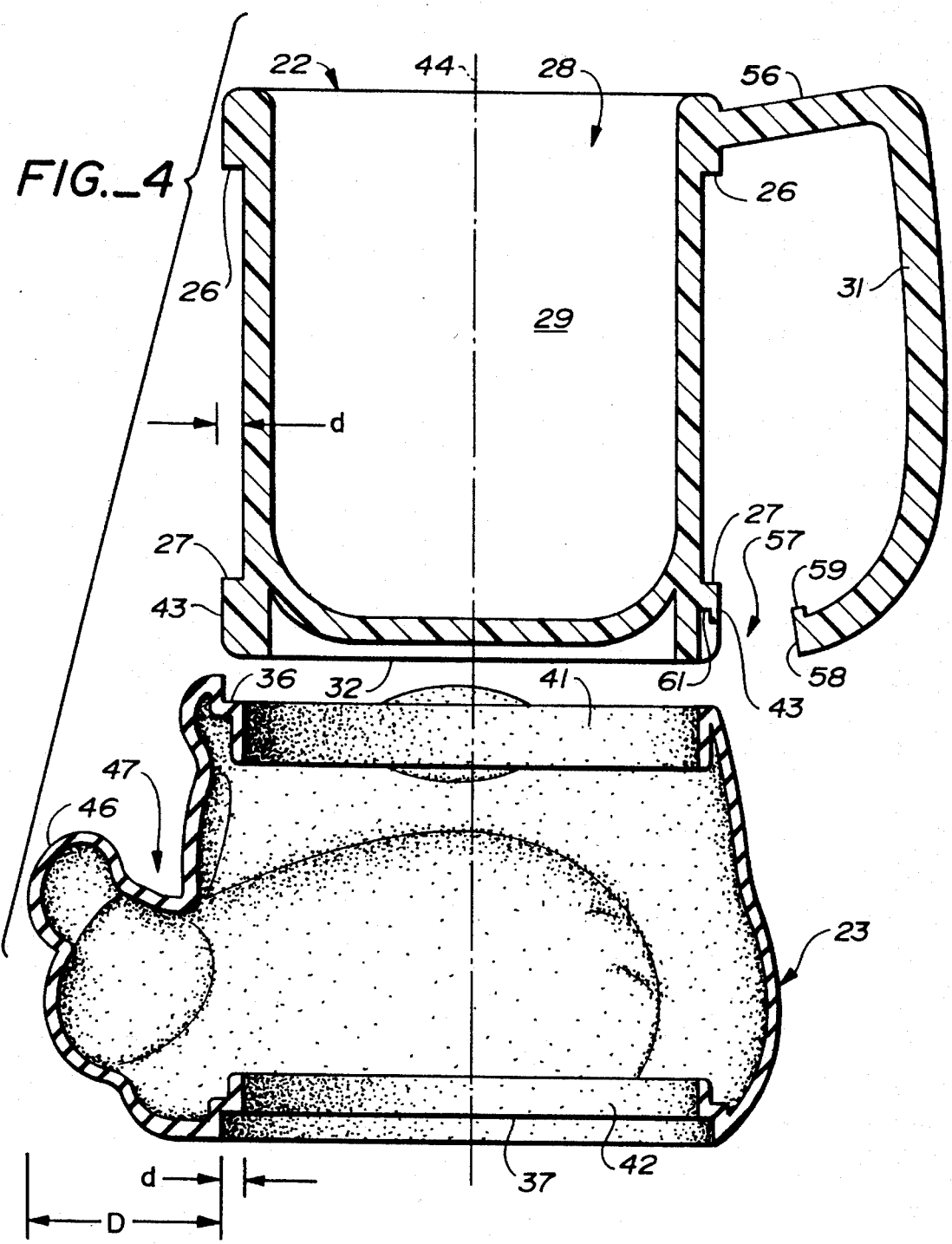

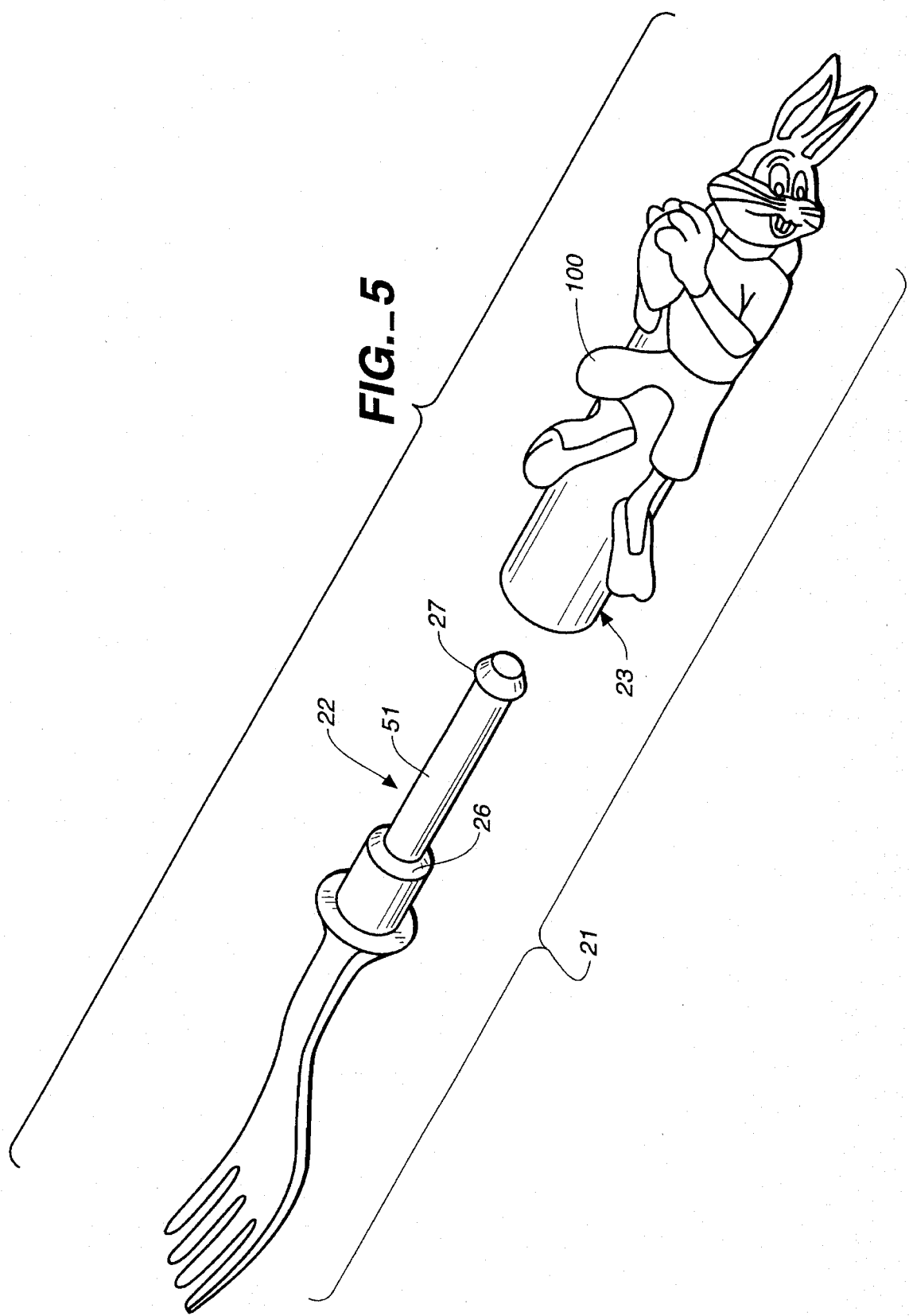

HIGH-RELIEF, RESILIENTLY FLEXIBLE, COMPOSITE MOLDED PLASTIC PRODUCT

This is a continuation of application Ser. No. 08/201,617 filed Feb. 25, 1994, which is now abandoned.

TECHNICAL FIELD

The present invention relates, in general, to injection molded and rotational molded products, and more particularly, it relates to a composite product in which injection molded and rotationally molded plastics are combined to provide a high-relief, flexible and yet strong plastic product.

BACKGROUND ART

Molded plastic products which have substantial three-dimensional or high-relief surfaces can be formed from numerous plastics using injection molding. Injection molding dies for high-relief products, however, are often quite expensive, making their use difficult to justify unless very large production runs are contemplated.

Rotational casting of plastic products is also a well-known plastic forming technique. The plastic compounds which are suitable for rotational casting, however, tend not to have the desired strength and impact resistance which can be achieved in connection with injection molded plastics.

Attempts have been made to combine injection molded and rotationally molded plastics into useful products having three-dimensional design features or ornamentation. Coffee cups have been manufactured, for example, which are a combination of an injection molded plastic central cup or core member, around which a rotationally molded decorative sleeve is secured. Such sleeves have three-dimensional design features on the exterior thereof, which are considerably less costly to rotationally mold than would be the case if the same design were injection molded as a part of the injection molded central cup.

Prior composite injection molded and rotationally molded products, however, have been found to have several substantial disadvantages. First, the three-dimensional design features add a depth dimension or relief which was relatively low. Second, mounting of the rotationally sleeves on the injection molded central cup members has required heating of the rotationally molded sleeve, with the result that once mounted on the cup, the sleeve shrinks down into direct contact with the cup member. This produces a product in which the sleeve is relatively hard and inflexible as the result of being supported directly by the hard and inflexible injection molded cup or core. Moreover, since the sleeve is in direct contact with the core over a substantial area, heat transfer through the combined walls is more rapid, which for products such as coffee cups is undesirable.

DISCLOSURE OF THE INVENTION

Accordingly, it is an object of the present invention to provide a molded plastic product which can include a very high-relief molded decorative features that are flexible and yet result in a composite product that has strength and impact resistance.

Another object of the present invention is to provide a molded plastic product which includes substantial three-dimensional decorative features which can be formed without the use of expensive injection molding procedures and equipment.

Still another object of the present invention is to provide a molded composite plastic product which has high-relief design features which is pleasing to touch as the result of its resilient flexibility.

Another feature of the present invention is to provide a strong, high-relief molded plastic product which has enhanced thermal insulating properties.

It is further an object of the present invention to provide a molded plastic product which has high-relief, is durable, is low in cost to manufacture and assemble and is adaptable for use in the creation of a wide range of designs.

The composite molded plastic prior to the present invention has other objects and features of advantage which will become apparent from, and are set forth in, more detail in the following description of The Best Mode of Carrying Out the Invention and the accompanying drawing.

The high-relief, resiliently flexible, composite molded plastic product of the present invention is comprised, briefly, of a relatively rigid injection-molded core member having a sleeve-receiving end and a pair of oppositely facing, axially spaced apart core shoulders; and a plastic sleeve member having a pair of oppositely facing sleeve shoulders, the sleeve member being mounted on the core member with the sleeve shoulders interengaged with the core shoulders over a depth dimension sufficient to secure the sleeve to the core. In the present invention, the sleeve member is rotationally cast from a plastisol dispersion of emulsion grade polyvinylchloride and suspension grade polyvinylchloride in a ratio of at least 3:1 of the emulsion grade to the suspension grade to provide a sleeve member with sufficient resilient elasticity for heat-free mounting of the sleeve onto the core over the sleeve-receiving end. Moreover, the sleeve member intermediate the sleeve shoulder is outwardly spaced from the core member to provide a resiliently flexible surface which is formed with at least one molded high-relief design feature having a depth dimension at least four times the depth dimension of the interengaged sleeve shoulders and core shoulders. In the preferred embodiment, the core member is formed from an injection molded high-impact polystyrene while the plastisol dispersion for the rotationally cast sleeve member contains at least five times as much emulsion grade polyvinylchloride as suspension grade polyvinylchloride.

BRIEF DESCRIPTION OF THE DRAWINGS

FIG. 1 is a top perspective view of a composite molded plastic product constructed in accordance with the present invention.

FIG. 2 is an exploded, top perspective view of the two-members forming the composite product of FIG. 1.

FIG. 3 is a side elevation view, in cross-section, of the product of FIG. 1 taken substantially along the plane of line 3—3 in FIG. 1.

FIG. 4 is a side elevation view, in cross section, of the members forming the composite product taken substantially along the plane of line 4—4 in FIG. 2.

FIG. 5 is a top perspective view of the composite molded plastic utensil constructed in accordance with the present invention.

BEST MODE OF CARRYING OUT THE INVENTION

The embodiment of the present invention which is illustrated in the drawings is a composite cup for use as a cup for coffee, chocolate, tea or the like, but it will be understood from the following description, that the molded product of the present invention can have other embodiments, for example, high-relief molded flexible handles 100 for eating and serving utensils as shown in FIG. 5.

Referring now to FIGS. 1 and 2, a composite molded plastic product, generally designated 21, is shown and includes a relatively rigid core member 22 and a high-relief plastic sleeve member, generally designated 23.

Core member 22 may advantageously be formed as an injection molded member from a relatively high strength and impact resistant plastic, such as high-impact polystyrene. Core member 22 can be seen to be a relatively simple or unadorned structure which requires only relatively simple injection molding dies. Core 22, however, does include a pair of oppositely facing axially spaced apart annular core shoulders 26 and 27. As shown in the drawing, the product 21 is a coffee cup and core member 22 is the central or cup portion of the product. Thus, core 22 includes an open upper end 28 to a cavity portion 29 having a volume designed to hold a liquid, such as tea, chocolate, juice, coffee, or the like. Extending outwardly from one side of the cup is a manually engageable handle 31, and although it will also be understood that the present product could be a coffee mug with handle 31 being eliminated. The core member 22 also includes a sleeve-receiving end, in this case the closed lower end 32 of member 22. Sleeve member 23 is mounted onto central core member 22 in a manner which will be described in more detail below in connection with FIG. 4.

In order to provide a high-relief surface on the relatively rigid core member 22 at a reasonable cost, the composite molded product of the present invention further includes a rotationally cast or molded sleeve 23, which is formed for mounting on core member 22. The plastic sleeve 23 has a pair of oppositely facing sleeve shoulders 36 and 37 which are formed in dimension for mating interengagement with core shoulders 26 and 27, as best may be seen in FIG. 3. As shown in the embodiment of the drawing, core shoulders 26 and 27 and sleeve shoulders 36 and 37 are each annular, continuous surfaces on their respective members 22 and 23. It will be understood, however, that other shoulder configurations, including discontinuous surfaces, can be employed to interlock sleeve member 23 to core member 22.

Core shoulders 26 and 27, and sleeve shoulders 36 and 37 preferably have a depth dimension, d, (FIG. 4) which is about the same. This distance, in a radial direction from the longitudinal central line 44 of cup 21, must be sufficiently large to positively secure the sleeve to the core, but preferably is sufficiently small that the resilient elasticity of the sleeve can be used for heat-free mounting of the sleeve onto the core. For a product such as a coffee mug, the depth, d, of the core and sleeve shoulders is preferably about 0.1 to 0.2 inches, with 0.15 inches being preferred. It has been found for the sleeve compounds set forth below that both upper annular sleeve band 41 and lower annular sleeve band 42 can be resiliently stretched over the outer core surface 43 of sleeve-receiving end 32 of core member 22.

Sleeve member 23 further includes at least one molded high-relief design feature, such as nose 46, which has a depth dimension, D, which is at least four times the depth dimension, d, of the interengaged shoulders 26, 27, 36 and 37. As shown in the illustrated embodiment, and particularly in FIG. 4, the relief dimension or depth dimension, D, of the design feature 46 is approximately ten times the depth dimension, d, of the interengaged shoulders. This allows a highly attractive three-dimensional design to be created, as best seen in FIGS. 1 and 2. Injection molding of high-relief design features, such as nose of 46, particularly features including the negative or undercut volume 47 above nose 46, would require very costly dies. Moreover, even rotational molding or casting of sleeve 23 cannot be accomplished in the high-relief shown in the drawing without using materials specially selected for the purpose.

Thus, it is a further important feature of the present invention that sleeve 23 be rotationally cast or molded from a plastisol dispersion which enables high-relief features to be cast. Thus, in the present invention sleeve 23 is rotationally molded from an emulsion grade polyvinylchloride and a suspension grade polyvinylchloride in which the ratio of the emulsion grade polyvinylchloride is at least 3:1 by weight, as compared to the suspension grade polyvinylchloride. Most preferably, the plastisol dispersion used for rotational casting of the present composite product contains at least five times as much emulsion grade polyvinylchloride as suspension grade polyvinylchloride.

In prior known composite molded products, sleeves have been formed using twice as much emulsion grade polyvinylchloride as suspension grade polyvinylchloride, but such sleeves have been suitable for products having design features with a relief dimension on the order of only two to three times the interlocking shoulder dimension. Moreover, such sleeves must be heated for mounting on their supporting cores and accordingly tend to shrink down and be relatively rigid as mounted on the cores.

The plastisol dispersion of the present invention allows sleeve 23 to have very high-relief design features, and the sleeve is pleasing to touch because it is resiliently flexible. Moreover, as best may be seen in FIG. 3, the sleeve 23 is supported by shoulders 36 and 37 in substantially spaced relation to outer surface 51 of core member 22 so that the inner surface 52 of sleeve 23 and outer surface 51 of core 23 define a volume or cavity 53 which surrounds a high percentage of core 22. This cavity provides thermal insulation against heat transfer between the liquid in the cup and the exterior of the cup, and it also allows the resilient sleeve material 54 to be inwardly squeezed and displaced by the user in a manner which is more pleasing to the touch than rigid prior rotationally cast surfaces. An opening or bore 71 (FIG. 3) can be provided in sleeve 23 at a lower end thereof to allow any moisture in cavity 53 to drain from the sleeve.

The plastisol dispersion used in forming the sleeve of the present invention further includes a plasticizer, a stabilizer, a catalyst and a mold release agent. Plasticizers such as diisononyl phthalate, epoxidized soybean oil and can be used, and a calcium/zinc stabilizer is preferably incorporated into the plastisol.

In the preferred form, the plastisol dispersion of the present invention includes the following constituents, by weight percent:

| | |
|---|---|
| emulsion grade polyvinylchloride | 51% |
| suspension grade polyvinylchloride | 10% |
| diisononyl phthalate | 17% |
| TXIB (2,2,4-trimethyl-1,3-pentanediol diisobutyrate) | 12% |
| calcium/zinc stabilizer | 5% |
| epoxidized soybean oil | 4.5% |
| mold release agent | 0.5%. |

Referring now to FIGS. 3 and 4, mounting of sleeve 23 over sleeve-receiving end 32 of core 22 can be described. The sleeve and core are axially aligned as shown in FIG. 4, and it will be seen that the inner surface of band 41 is smaller in diameter than the outer surface 43 of sleeve-receiving end 32 of the core. The resilience of the rotationally cast polyvinylchloride produced by the plastisol dispersion above set forth, however, allows band 41 to be engaged with one side of surface 43 and stretched outwardly or radially from center line 44 until band 41 can be stretched over annular surface 43. The sleeve can then be urged upwardly until band 41 passes beyond surface 43 on the sleeve-receiving end of the cup. The process is again repeated for the lower sleeve band 42, and the sleeve urged upwardly until shoulder 37 snaps inwardly as it is advanced beyond shoulder 27 on the core. The result is shown in FIGS. 1 and 3.

As will be seen in FIG. 4, cup handle 31 can be resiliently flexed at 56 so as to provide a space 57 between the end 58 of the handle and surface 43. This allows the sleeve to pass upwardly onto the core until the sleeve shoulders are interlocked with the core shoulders. The end 58 can also be seen to include a latching protrusion 59 which mates with a recess 61 in the core. Thus, handle 31 is first moved outwardly, as indicated by arrow 62 in FIG. 3 to allow sleeve 23 to be mounted over the core. The handle is then moved from the outward solid line position of FIG. 4 back to the position shown in FIG. 3 in which the protrusion 59 mates with the recess 61 below the sleeve. Preferably, end 58 is secured in the position of FIG. 3 by an adhesive after mounting of the sleeve to the core. Such handle latching assembly structures, however, are known in the prior art and do not constitute a novel portion of the present invention.

As will be seen from FIG. 1, therefore, the molded composite plastic product of the present invention has a rigid, high-strength core capable of retaining hot and cold liquids. The core is formed of a relatively simple shape which facilitates injection molding with dies of reasonable cost. Mounted to the core is a highly decorative and three-dimensional sleeve that is flexible and resiliently supported in spaced relation to the core over a majority of the surface thereof. The core and sleeve are secured together by interengaged shoulders of sufficient depth to lock the two together, but which are sufficiently small in depth to enable heat-free mounting of the sleeve to the core. It is possible, although not normally required, to adhesively secure the core and sleeve together proximate the interengaged shoulder.

What is claimed is:

1. A high strength and impact resistant composite molded plastic product for use as a container for liquid comprising:

a rigid core member having a sleeve-receiving end and a pair of oppositely facing, axially spaced apart core shoulders formed therein each having a shoulder radial depth dimension extending radially outward, relative a core longitudinal axis, from a core outer surface to a respective shoulder outer surface; and a resiliently flexible plastic sleeve member having a pair of oppositely facing sleeve shoulders formed for interengagement with said core shoulders over said shoulder radial depth dimension sufficient to secure and mount said sleeve member on said core member, said sleeve member being rotationally cast from a plastisol dispersion of emulsion grade polyvinylchloride and suspension grade polyvinylchloride in a ratio of at least 3 to 1 by weight to provide a set sleeve member of said ratio with a resilient elasticity sufficient to enable heat-free mounting of said sleeve member onto said core member over said sleeve-receiving end until said core shoulders and said sleeve shoulders are interengaged, an inner surface of said sleeve member intermediate said sleeve shoulders being outwardly spaced from said core outer surface over a substantial area of the sleeve inner surface to provide an insulatory cavity between said inner surface and said outer surface, and said sleeve member including at least one prominent molded design feature having a feature radial depth dimension extending radially outward, relative the sleeve longitudinal axis, from the core outer surface to a distal surface of said prominent feature at least four times said shoulder radial depth dimension.

2. The composite molded plastic product as defined in claim 1 wherein, said core member is an injection molded plastic member.

3. The composite molded plastic product as defined in claim 2 wherein, said core member is formed from polystyrene.

4. The composite molded plastic product as defined in claim 2 wherein, said plastisol dispersion contains at least 5 times as much emulsion grade polyvinylchloride as suspension grade polyvinylchloride.

5. The composite molded plastic product as defined in claim 2 wherein, said plastisol dispersion further includes a plasticizer, stabilizer, catalyst and mold release agent.

6. The composite molded plastic product as defined in claim 2 wherein, said plastisol dispersion further includes diisononyl phthalate, 2,2,4-trimethyl-1,3-pentanediol diisobutyrate, a calcium/zinc stabilizer, epoxidized soybean oil, and a mold release agent.

7. The composite molded plastic product as defined in claim 6 wherein, said plastisol dispersion has the following constituents, by weight percent:

| | |
|---|---|
| emulsion grade polyvinylchloride | 51% |
| suspension grade polyvinylchloride | 10% |
| diisononyl phthalate | 17% |
| 2,2,4-trimethyl-1,3-pentanediol diisobutyrate | 12% |
| calcium/zinc stabilizer | 5% |
| epoxidized soybean oil | 4.5% |
| mold release agent | 0.5% |

8. The composite molded product as defined in claim 2 wherein, said feature radial depth dimension is at least equal to 6 times the shoulder radial depth dimension.

9. The composite molded product as defined in claim 2 wherein, said feature radial depth dimension is at least equal to 10 times the shoulder radial depth dimension.

10. The composite molded product as defined in claim 2 wherein, said core member is comprised of a plastic capable of retaining hot liquids.

11. The composite molded product as defined in claim 1 wherein, said core member defines a cavity portion formed for receipt of liquid.

12. A high strength and impact resistant composite molded plastic product for use as a handle for a utensil comprising:

a rigid core member having a sleeve-receiving end and a pair of oppositely facing, axially spaced apart core shoulders formed therein each having a shoulder radial depth dimension extending radially outward, relative a core longitudinal axis, from a core outer surface to a respective shoulder outer surface; and a resiliently flexible plastic sleeve member having a pair of oppositely facing sleeve shoulders formed for interengagement with said core shoulders over said shoulder radial depth dimension sufficient to secure and mount said sleeve member on said core member, said sleeve member being rotationally cast from a plastisol dispersion of emulsion grade polyvinylchloride and suspension grade polyvinylchloride in a ratio of at least 3 to 1 by weight to provide a set sleeve member of said ratio with a resilient elasticity sufficient to enable heat-free mounting of said sleeve member onto said core member over said sleeve-receiving end until said core shoulders and said sleeve shoulders are interengaged, an inner surface of said sleeve member intermediate said sleeve shoulders being outwardly spaced from said core outer surface over a substantial area of the sleeve inner surface to provide an insulatory cavity between said inner surface and said outer surface, and said sleeve member including at least one prominent molded design feature having a feature radial depth dimension extending radially outward, relative the sleeve longitudinal axis, from the core outer surface to a distal surface of said prominent feature at least four times said shoulder radial depth dimension.

13. The composite molded plastic product as defined in claim 12 wherein, said core member is an injection molded plastic member.

14. The composite molded plastic product as defined in claim 13 wherein, said core member is formed from polystyrene.

15. The composite molded plastic product as defined in claim 13 wherein, said plastisol dispersion contains at least 5 times as much emulsion grade polyvinylchloride as suspension grade polyvinylchloride.

16. The composite molded plastic product as defined in claim 13 wherein, said plastisol dispersion further includes a plasticizer, stabilizer, catalyst and mold release agent.

17. The composite molded plastic product as defined in claim 13 wherein, said plastisol dispersion further includes diisononyl phthalate, 2,2,4-trimethyl-1,3-pentanediol diisobutyrate, a calcium/zinc stabilizer, epoxidized soybean oil, and a mold release agent.

18. The composite molded plastic product as defined in claim 17 wherein, said plastisol dispersion has the following constituents, by weight percent:

| | |
|---|---|
| emulsion grade polyvinylchloride | 51% |
| suspension grade polyvinylchloride | 10% |
| diisononyl phthalate | 17% |
| 2,2,4-trimethyl-1,3-pentanediol diisobutyrate | 12% |
| calcium/zinc stabilizer | 5% |
| epoxidized soybean oil | 4.5% |
| mold release agent | 0.5% |

\* \* \* \* \*